US008690402B2

(12) United States Patent
Durkin et al.

(10) Patent No.: US 8,690,402 B2
(45) Date of Patent: Apr. 8, 2014

(54) ILLUMINATED GRAB HANDLE WITH DUAL ILLUMINATION MODES

(75) Inventors: Jedidiah Paul Durkin, Detroit, MI (US); Luis Miguel Lopez Gonzalez, Mexico City (MX)

(73) Assignee: Ford Global Technologies, LLC, Dearbora, MI (US)

(*) Notice: Subject to any disclaimer, the term of this patent is extended or adjusted under 35 U.S.C. 154(b) by 0 days.

(21) Appl. No.: 13/467,293

(22) Filed: May 9, 2012

(65) Prior Publication Data
US 2013/0301289 A1 Nov. 14, 2013

(51) Int. Cl.
*B60Q 3/04* (2006.01)
*B60Q 3/02* (2006.01)
*B60Q 1/32* (2006.01)

(52) U.S. Cl.
CPC .............. *B60Q 3/0233* (2013.01); *B60Q 1/323* (2013.01)
USPC .............................. 362/490; 362/544; 362/545

(58) Field of Classification Search
CPC ..................... B60Q 3/0233; B60Q 1/323
USPC ......... 362/479, 544, 487–488, 490, 145–147, 362/501, 100; 16/110.1, 415, 416, 419, 16/420, 422, 424, 445, 438, 439; 315/84
See application file for complete search history.

(56) References Cited

U.S. PATENT DOCUMENTS

| 6,523,888 | B1 | 2/2003 | Yan et al. | |
| 6,553,629 | B2 | 4/2003 | Grady et al. | |
| 6,648,493 | B2* | 11/2003 | Klein | 362/501 |
| 6,793,385 | B2* | 9/2004 | Tiesler et al. | 362/501 |
| 6,907,643 | B2* | 6/2005 | Koops et al. | 16/438 |
| 7,455,437 | B2* | 11/2008 | Shi | 362/501 |
| 8,235,554 | B2* | 8/2012 | Steinkraus | 362/283 |
| 2002/0030988 | A1* | 3/2002 | Stapf | 362/85 |
| 2004/0062047 | A1* | 4/2004 | Camarota et al. | 362/399 |
| 2004/0109324 | A1 | 6/2004 | Tiesler et al. | |
| 2005/0219854 | A1 | 10/2005 | Grady | |
| 2006/0104072 | A1* | 5/2006 | Chen | 362/493 |
| 2007/0258258 | A1* | 11/2007 | Wang | 362/501 |

OTHER PUBLICATIONS

"Chrome Lighted Grab Handle," Grand General Accessories Manufacturing, www.grandgeneral.com, Copyrighted 2011, 1 page.

* cited by examiner

*Primary Examiner* — Diane Lee
*Assistant Examiner* — Gerald J Sufleta, II
(74) *Attorney, Agent, or Firm* — Vichit Chea; Price Heneveld LLP

(57) ABSTRACT

An illuminated grab handle assembly for a vehicle includes a handle body and at least one light source. The handle body has a center portion and two opposed ends and is adapted to be attached to a surface of the vehicle interior. The at least one light source is disposed within the center portion of the handle body for illuminating the vehicle interior. The illuminated grab handle assembly is operable to provide more than one mode of illumination for the vehicle interior.

21 Claims, 3 Drawing Sheets

ILLUMINATED GRAB HANDLE WITH DUAL ILLUMINATION MODES

FIELD OF THE INVENTION

The present invention generally relates to grab handles for vehicles, and more particularly to an illuminated grab handle with at least one source of illumination that provides lighting for an interior of a motor vehicle.

BACKGROUND OF THE INVENTION

Grab handles have become a standard feature of passenger vehicles. They are provided in vehicles to assist occupants as they enter and exit a vehicle, as well as to maintain their seated position when driving over rough terrain. A wide variety of grab handle designs are available, but most are attached to the vehicle roof structure, often through the headliner. Grab handle assemblies typically include a handle and multiple brackets and backing members. Some grab handles are provided with additional features, such as a garment or a coat hook. It is further known to provide overhead lighting in passenger vehicles, generally the most common being the well known dome lamp. Sources of light, sometimes referred to as dome lamps, map lamps, or courtesy lighting, are located in various convenient locations in the overhead area of the vehicle. These lights may be independently mounted to the headliner or the roof structure, or may be incorporated into other overhead devices, such as overhead consoles.

SUMMARY OF THE INVENTION

According to one aspect of the present invention, an illuminated grab handle assembly for a vehicle is provided. The illuminated grab handle assembly includes a handle body and at least one light source. The handle body has a center portion and two opposed ends and is adapted to be attached to a surface of the vehicle interior. At least one light source is disposed within the center portion of the handle body for illuminating the vehicle interior.

According to another aspect of the present invention, an illuminated grab handle assembly for a vehicle is provided. The illuminated grab handle assembly includes a handle body and at least one light source. The handle body has opposed ends and is adapted to be attached to a surface of the vehicle interior. The illuminated grab handle assembly is operable to provide more than one mode of illumination for the vehicle interior.

According to yet another aspect of the present invention, an illuminated grab handle assembly for a vehicle is provided. The illuminated grab handle assembly includes a handle body adapted to be mounted to a vehicle headliner, and at least one light source disposed within the handle body and operable in at least one of a functional illumination mode and an ambient illumination mode for illuminating the vehicle interior. Additionally, the illuminated grab handle assembly includes a power switch for selectively powering the at least one light source.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
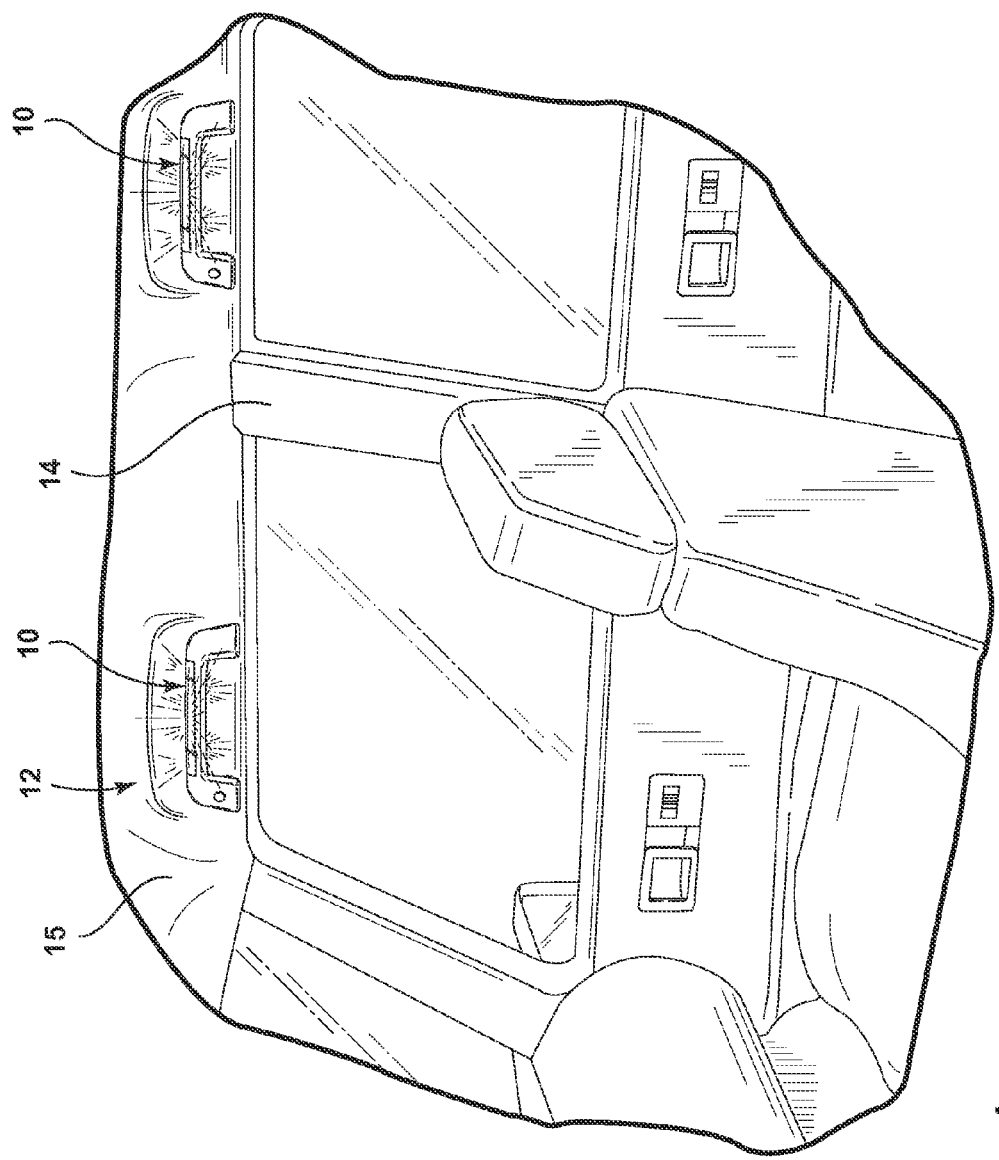
FIG. 1 is a side elevational view of two illuminated grab handle assemblies mounted to an interior surface of a vehicle.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
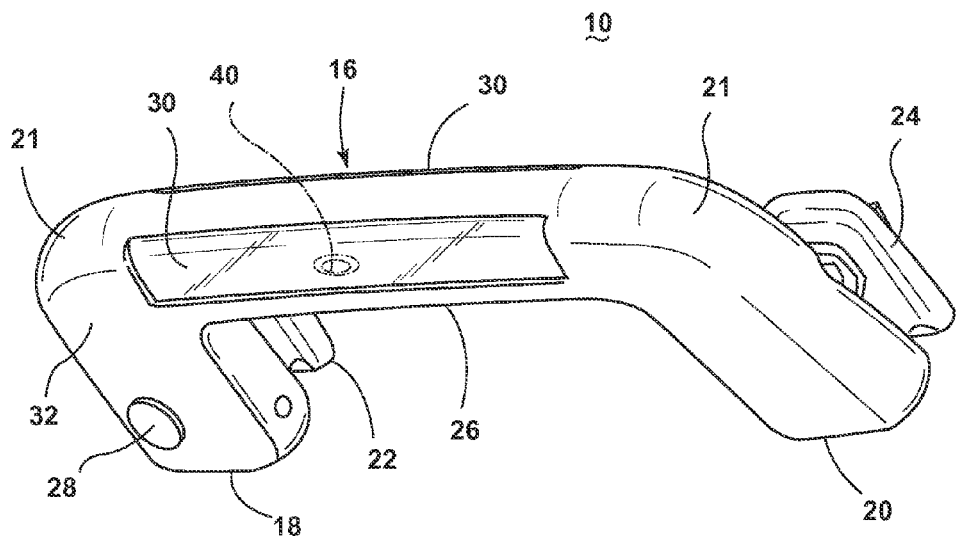
FIG. 2 is a bottom perspective view of the illuminated grab handle assembly, according to one embodiment of the invention.
Figure 3:
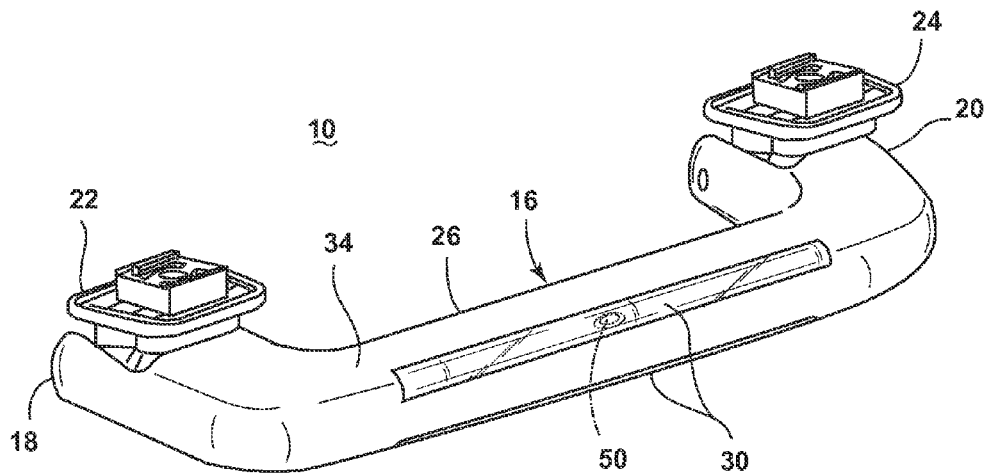
FIG. 3 is a top perspective view of the illuminated grab handle assembly of FIG. 2.

Referring to FIGS. 1-3, reference numeral 10 generally designates one embodiment of an illuminated grab handle assembly. FIG. 1 illustrates an exemplary automotive vehicle 12, having an interior surface 14 to which a pair of illuminated grab handle assemblies 10 is attached. The illuminated grab handle assembly 10 includes a substantially C-shaped handle body 16 which has two opposed ends: a first end 18, and a second end 20. A first mounting member 22 is disposed at the first end 18, and a second mounting member 24 is disposed at the second end 20. Further, the first and second mounting members 22, 24 are pivotally connected to the first and second ends 18, 20, respectively. The handle body 16 is adapted to be hingedly affixed to the interior surface 14 of the vehicle 12 by mounting the first and second mounting members 22, 24 to the interior surface 14 of the vehicle 12, often through a headliner 15. Alternatively, the handle body 16 may be rigidly mounted to the vehicle 12 or the interior surface 14.

The handle body 16 includes an integral center portion 26 that is disposed intermediate the first and second ends 18, 20. In the illustrated example, the center portion 26 and first and second ends 18, 20 are disposed at obtuse angles, and have arcuate transitions 21 therebetween. Additionally, the handle body 16 is generally sized for a user's hand to grasp the handle body 16 during ingress/egress of the vehicle 12, or during travel over rough terrain. It should be understood that the specific handle body 16 geometry may vary from the illustrated example, and may be designed to provide an aesthetically pleasing appearance.

The illuminated grab handle assembly 10 includes at least one light source disposed within the center portion 26 of the handle body 16 for illuminating the vehicle 12 interior. The light source can be any suitable source of light, such as a light emitting diode (LED) or an incandescent bulb, as known to those skilled in the art. The illuminated grab handle assembly 10 also includes a power switch 28 for selectively connecting the at least one light source to a vehicle electrical system. The power switch 28 may be a push button, or any other suitable means of actuation, for activating and deactivating the light source. Although not illustrated, it is contemplated that the light source may be electrically connected by a flexible or molded wire that is routed through the handle body 16 and one of the mounting members 22, 24. Alternatively, the light source may be powered by a battery disposed within the handle body 16. The illuminated grab handle assembly 10 also includes a lens 30 to hide or obscure the internal components and to direct illumination from the light source into the interior of the vehicle 12. The lens 30 may be translucent, opaque, transparent, or have any other desirable light transmission treatment. Further, it is contemplated that the lens 30 be flush mounted to the handle body 16 to provide an aesthetically pleasing appearance.

Referring to the embodiment illustrated in FIGS. 2-3, the illuminated grab handle assembly 10 may include more than one light source. For example, a first light source 40 is disposed within the handle body 16 on an interior-facing surface 32 thereof and a second light source 50 is disposed within the handle body 16 on an exterior-facing surface 34 thereof. With the illuminated grab handle assembly 10 installed in the vehicle 12, the exterior-facing surface 34 is defined as the surface of the handle body 16 that is positioned between the handle body 16 and the headliner 15. Notably, both the first and second light sources 40, 50, and associated lenses 30, are disposed within the center section 26 of the handle body 16.

Figure 4:
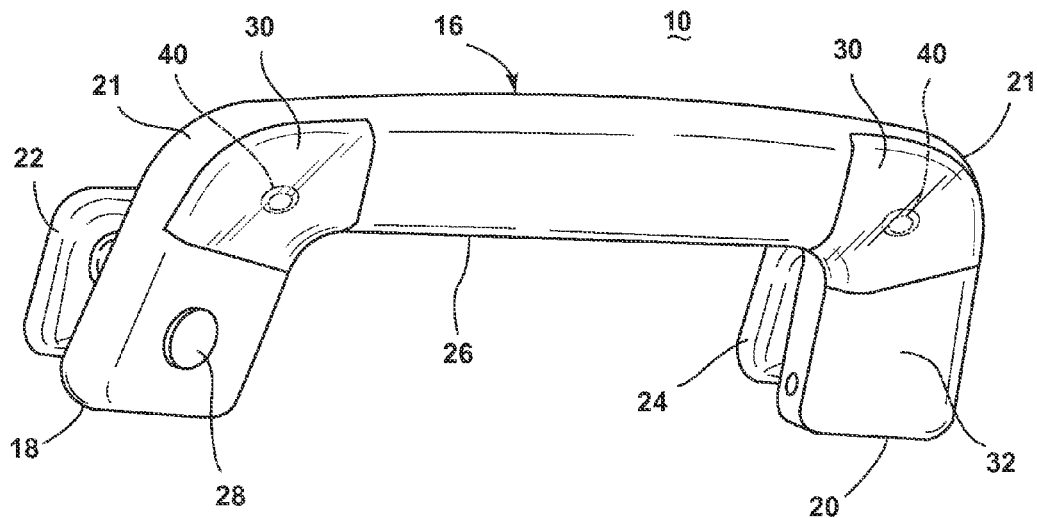
FIG. 4 is a bottom perspective view of a illuminated grab handle assembly, according to another embodiment of the invention.
Figure 5:
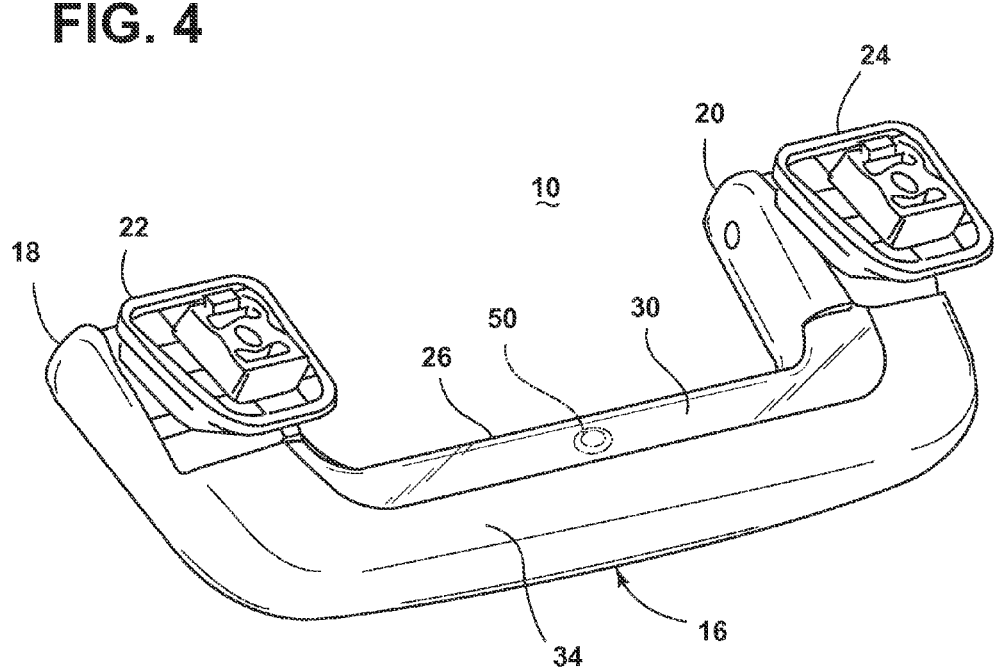
FIG. 5 is a top perspective view of the illuminated grab handle assembly of FIG. 4.

Referring now to another embodiment illustrated in FIGS. 4-5, the illuminated grab handle assembly 10 includes two light sources 40 disposed at the transitions 21 between the center portion 26 and the first and second ends 18, 20, on the interior-facing surface 32. A third light source 50 is disposed on the exterior-facing surface 34 of the handle body 16. While the lenses 30 which cover the light sources 40, 50 are illustrated as being generally elongate and rectangular or pie-shaped, it is contemplated they could be any suitable shape, including circular or ovate.

According to another embodiment, the illuminated grab handle assembly 10 is operable to provide more than one mode of illumination for the vehicle 12 interior. For example, the illuminated grab handle assembly 10 is operable in both functional and ambient illumination modes, as well as any other suitable mode of vehicle illumination known in the art. The functional illumination mode is substantially equivalent to task lighting, distributing a concentrated area of light on a limited area within the vehicle 12 for purposes such as reading. The ambient illumination mode is accent lighting, distributing diffuse light to the interior of the vehicle 12, and is most often used for decorative lighting, backlighting, or for providing low levels of illumination to the interior. The illuminated grab handle assembly 10 is adapted to provide at least functional and ambient illumination to the vehicle interior, and it is contemplated that this can be accomplished in more than one way.

According to one embodiment, multiple light sources in multiple locations are utilized to provide multiple illumination modes. Referring to the embodiment illustrated in FIGS. 2-3, the first light source 40 is a functional light source and is positioned on the interior-facing surface 32 for use in the functional illumination mode. The second light source 50 is an ambient light source and is positioned on the exterior-facing surface 34 for use in the ambient illumination mode. When activated, the functional illumination mode projects task lighting to the interior of the vehicle 12, while the ambient illumination mode projects accent lighting onto the headliner 15. As stated above, the functional illumination mode can be used for reading and other such tasks that are benefited by a concentrated area of light directed on a limited area within the vehicle 12 interior, including map/reading and dome lights. Conversely, the ambient illumination mode can be used to provide low intensity, diffuse light projected onto the headliner 15 for ingress/egress ease and decorative accent purposes, including mood lighting. The ambient illumination mode could also be used to provide a very low intensity light for showing only the location of the illuminated grab handle assembly 10 and without distracting the driver during night driving. For any illumination mode, the specific target area, intensity, diffusion, and other aspects involved in lighting design may be considered when selecting the specific light source, reflector, lens material, and other lighting components.

The illuminated grab handle assembly embodiment illustrated in FIGS. 4-5, includes two discrete functional light sources 40 and an ambient light source 50. The functional light sources 40 are shown positioned at the transitions 21 between the center portion 26 and the first and second ends 18, 20, on the interior-facing surface 32 for use in the functional illumination mode. The ambient light source 50 is disposed on the exterior-facing surface 34 for use in the ambient illumination mode. In another embodiment, similar to that depicted in FIG. 2, the light source on the interior-facing surface 32 can provide both functional and ambient light. This could be achieved by using a single light source operable in both functional and ambient illumination modes, or by using two light sources positioned beneath the single lens 30.

Additionally, it is contemplated that the at least one light source can be selectively activated by the power switch 28. As previously described, the power switch 28 may be a push button, capacitive switch, or any other suitable means of actuation, for activating and deactivating the light source. More specifically, the power switch 28 can be configured to selectively switch the functional and ambient light sources between on, off, functional and ambient illumination modes. This can be accomplished with a suitable push-push, toggle, capacitive, or multi-position type switch, as is known to one skilled in the art. Additionally, the ambient light source 50 may be directly electrically connected to the vehicle's electrical system such that the ambient light source 50 is activated when a vehicle door is opened or unlocked, a dome light is turned on, or other such vehicle activity or setting activates the vehicle's 12 other interior lighting.

It is also contemplated that the illuminated grab handle assembly 10 may include a damper or other detent mechanism which would allow a user to adjust the angular position of the handle body 16 so as to orient the illumination onto a desirable location. Stated differently, the inclusion of a damper or other type detent mechanism would enable a user to pivot the handle body 16 to shine light onto a certain location or direction, and maintain the position of the handle body 16 after the user released the handle body 16.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An illuminated grab handle assembly for a vehicle, comprising:
   a handle body having opposing ends fixedly attached to an interior surface of the vehicle above a door of the vehicle and a center portion between the opposing ends that is sized for a user's hand to grasp;

a first light source disposed within the center portion that projects a concentrated light beam away from the interior surface for task lighting; and a second light source disposed within the center portion that projects light against the interior surface, providing a diffused light beam away from the interior surface for accent lighting, wherein the diffused light beam has a lower intensity than the concentrated light beam.

2. The illuminated grab handle assembly of claim 1, further comprising:

mounting members disposed at the opposing ends of the handle body; and a power switch for selectively connecting the first light source to a vehicle electrical system.

3. The illuminated grab handle assembly of claim 1, wherein the first light source is positioned to project through an interior-facing surface of the center portion.

4. The illuminated grab handle assembly of claim 3, wherein the second light source is positioned to project through an exterior-facing surface of the center portion that is opposite the interior-facing surface.

5. The illuminated grab handle assembly of claim 1, further comprising:

a power switch on the center portion that is configured to selectively switch between a functional illumination mode for illuminating the first light source and an ambient illumination mode for illuminating the second light source.

6. The illuminated grab handle assembly of claim 5, wherein the ambient illumination mode illuminates the second light source when a door of the vehicle is opened.

7. The illuminated grab handle assembly of claim 1, wherein the handle body is pivotally coupled to the surface of the vehicle.

8. An illuminated grab handle assembly for a vehicle, comprising:

a handle having opposing ends attached to an interior surface of the vehicle above a vehicle door;

a first light source within the handle that projects concentrated light away from the interior surface, defining a functional mode; and a second light source within the handle that projects light to the interior surface that diffuses and projects less concentrated light therefrom, defining an ambient mode.

9. The illuminated grab handle assembly of claim 8, wherein the interior surface includes a headliner of the vehicle.

10. The illuminated grab handle assembly of claim 8, wherein the handle includes an interior-facing surface with a first lens coupled with the first light source and an exterior-facing surface with a second lens coupled with the second light source.

11. The illuminated grab handle assembly of claim 10, wherein the interior-facing surface includes a switch for manually selecting the functional mode on or off.

12. The illuminated grab handle assembly of claim 10, wherein the exterior-facing surface is positioned between the handle body and the headliner.

13. The illuminated grab handle assembly of claim 10, wherein the second light source is disposed centrally between the opposing ends on the exterior-facing surface of the handle body.

14. The illuminated grab handle assembly of claim 8, wherein the interior surface of the vehicle includes a headliner, and wherein the ambient mode provides light with less intensity than the functional mode.

15. The illuminated grab handle assembly of claim 14, wherein the functional and ambient modes are separately actuatable by a power switch.

16. The illuminated grab handle assembly of claim 15, wherein the power switch is disposed on the handle.

17. An illuminated grab handle assembly for a vehicle, comprising:

a handle mounted to a headliner;

a light source within the handle that operates in a functional illumination mode, projecting concentrated light away from the headliner, and an ambient illumination mode, projecting light onto the headliner that provides diffused light away from the headliner with less intensity than the concentrated light; and a switch proximate that handle that selects the functional illumination mode on or off.

18. The illuminated grab handle assembly of claim 17, wherein the light source includes an interior-facing light source for the functional illumination mode and an exterior-facing light source for the ambient illumination mode.

19. The illuminated grab handle assembly of claim 18, wherein the exterior-facing light source is disposed within a center portion of the handle and projects in a substantially opposite direction from the interior-facing light source.

20. The illuminated grab handle assembly of claim 18, wherein the interior-facing light source includes a pair of discrete light sources spaced at opposing ends of the handle.

21. The illuminated grab handle assembly of claim 17, wherein the ambient illumination mode is actuatable between on and off, and wherein the ambient mode is actuated to on when a door of the vehicle is opened.

* * * * *